United States Patent [19]

Gupta et al.

[11] Patent Number: 4,529,237
[45] Date of Patent: Jul. 16, 1985

[54] ROBOTIC GRIPPER DRIVE SYSTEM

[75] Inventors: Omkarnath R. Gupta; Albert L. Torino, both of Boca Raton, Fla.

[73] Assignee: International Business Machines Corporation, Armonk, N.Y.

[21] Appl. No.: 447,546

[22] Filed: Dec. 7, 1982

[51] Int. Cl.³ .......................... A61P 1/06; B25J 15/00
[52] U.S. Cl. ..................................... 294/86.4; 294/106
[58] Field of Search ..................... 294/86 R, 88, 99 R, 294/106, 111; 3/12, 12.6, 12.7, 12.8; 74/52, 37, 32; 414/4, 739, 741

[56] References Cited

U.S. PATENT DOCUMENTS

| | | | |
|---|---|---|---|
| 2,754,687 | 7/1956 | Brandon | 74/52 |
| 3,848,753 | 11/1974 | Borg et al. | 294/86 R |
| 4,121,422 | 10/1978 | Flinn, Jr. | 60/597 |
| 4,286,380 | 9/1981 | Blount | 29/741 |
| 4,364,593 | 12/1984 | Maeda | 294/106 |

Primary Examiner—James B. Marbert
Attorney, Agent, or Firm—Harold H. Sweeney, Jr.; Jesse L. Abzug; Steven J. Meyers

[57] ABSTRACT

A compact low-cost drive for a robotic gripper system is disclosed having a rotationally driven shaft connected to an energy source for transmitting energy provided by the energy source to the gripper. An epicyclic gear arrangement is coupled to the shaft to convert the rotational motion of the shaft into a linear motion. At least one of the pins connected to the gears is linearly translateable in two directions under the control of the energy source. Fingers are recessed in the pins to facilitate gripping and releasing objects to be handled by the gripper system. A feedback means coupled between the energy source and the fingers can also be used to sense and control the position of the fingers.

12 Claims, 5 Drawing Figures

ROBOTIC GRIPPER DRIVE SYSTEM

DESCRIPTION

1. Technical Field

The invention relates to a drive apparatus for a robotic gripper.

2. Background Art

Robots are currently being used or being planned for use for a continually expanding number of applications. The ability to control and drive these robots constitutes one of the most important factors in what applications a robot can feasibly be used to perform. Furthermore, it is important to keep the cost and size of robotic gripper drive systems at a minimum to encourage the conversion from manual to automated task performance.

A mechanism for driving the fingers of a robotic gripper is disclosed in background literature, for example, U.S. Pat. No. 4,286,380. A gear system driven by an electric motor will cause finger pairs which are directly attached to a pair of rotatable gears to move toward and away from one another. This rotational movement of the gears allows the robotic gripper to grip and release components.

Problems commonly present among many prior drive mechanisms for robotic grippers include reliance on overly complex or expensive mechanical systems and use of mechanisms which provide only rotational and not linear motion to the fingers.

DISCLOSURE OF THE INVENTION

The robotic gripper drive system of the present invention employs a compact epicyclic gear arrangement which converts the rotational motion of a drive shaft into a linear motion. This linear motion is via pins which are coupled to the robotic fingers which grip and release objects to be handled by the gripper system. Many different interchangeable finger configurations are readily adapted to the drive system. An energy source is coupled to the drive shaft and used to control the bidirectional linear motion of the fingers. The pins are fixed to floating gears and disposed within a slot in a base such that the slot clears the linear path of the fingers. The gear arrangement employed in this embodiment of the subject invention includes at least two internal gears, at least two floating gears and a drive gear. A floating gear is retained against and within each internal gear. The floating gears travel a circular path defined by the inner circumference of the internal gears. The present invention may also include a feedback means for sensing the position of the fingers.

Moreover, the present invention may also employ one stationary finger fixed to the base and one bidirectionally movable finger as opposed to the use of two bidirectionally movable fingers.

The present invention offers several advantages over prior robotic gripper drive systems. The present invention provides linear rather than rotational motion to the fingers. This linear motion is produced without the need for a complex mechanical system. Many different energy sources can also be used with the gripper drive of the present invention, for example, electric motors, hydraulics or air.

The present invention is compact and can be produced from many types of material to allow for an inexpensive gripper drive.

The present invention is versatile in that various finger gripping attachments can be employed. Moreover, the gripper drive system of the present invention is also upgradeable or downgradeable for various load applications.

BEST MODE FOR CARRYING OUT THE INVENTION

The gripper drive system of the present invention employs a rotationally driven shaft 10 which is coupled to an energy source 35 for transmitting the energy provided by the energy source to the gripper system. The energy source used with the drive of the present invention can be selected from a wide variety of types. For example, electric motors, hydraulics, or air can be used to rotate shaft 10.

Figure 2:
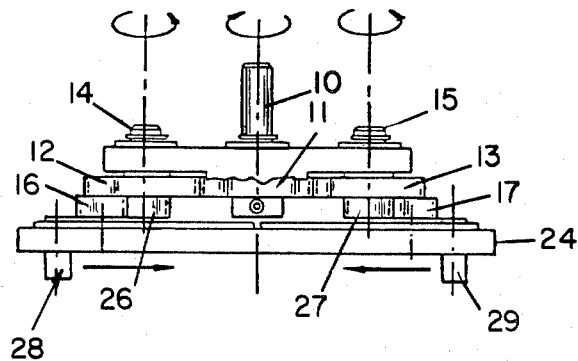
FIG. 2 is a side view of the gripper drive of the present invention with two bidirectionally movable pins.
Figure 3:
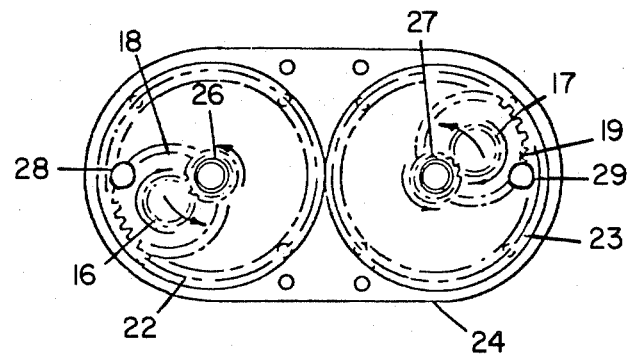
FIG. 3 is a top view of a portion of the gear arrangement of the gripper drive of the present invention with two bidirectionally movable pins.

Shaft 10 is coupled to a plurality of gears which serve to convert the rotational motion of shaft 10 to linear motion. Specifically, in the preferred embodiment used to illustrate the present invention (see FIGS. 1, 2 and 3), shaft 10 is fixed to gear 11. Gear 11 is then in turn coupled to cluster gears 12 and 13. Shaft 14 and shaft 15 are also connected to cluster gears 12 and 13, respectively. Gears 12 and 13 are the first in a series of two identical sets of five gears disposed across from one another symmetrically located on either side of shaft 10.

Gear 12 and gear 13 propogate the energy received from shaft 10 via gear 11 on to gear 26 and gear 27, respectively. Gear 26 is then engaged with the cluster floating gear consisting of gear 16 and gear 18 while gear 27 is engaged with the cluster floating gear consisting of gear 17 and gear 19. A pin 28 is fixed to gear 18 at the gear pitch circle present on gear 18. Likewise a pin 29 is fixed to gear 19 at the gear pitch circle present on gear 19.

The final gears in the series of five on each side of shaft 10 are internal or annual gears 22 and 23. Gear 18 is retained against and within gear 22. Gear 19 is likewise in mesh with gear 23. Gears 18 and 19, therefore, travel a circular path defined by the inner circumference of gears 22 and 23. Furthermore, gear 22 and gear 23 are fixed to a base 24. Base 24 has an elongated slot 25 into which pin 28 and pin 29 are accommodated. Slot 25 clears the linear path which pin 28 and pin 29 traverse along the centerline of base 24.

Pin 28 and pin 29 are recessed into finger 32 and finger 33, respectively. Finger 32 and finger 33 are moved linearly towards and away from one another within the confines of retainers 30 and 31. This linear movement which is controlled by the energy source allows finger 32 and finger 33 to cooperatively grip and release objects to be handled by the gripper system. Retainers 30 and 31 are fixed to and removable from the bottom of base 24. Both retainers 30 and 31 are dove-tail shaped to accommodate fingers 32 and 33. Holes are provided in fingers 32 and 33 to provide for coupling to pins 28 and 29. Various ways for holding fingers 32 and 33 are possible. For example, retainers 30 and 31 can be readily fastened to base 24 allowing fingers 32 and 33 to engage pins 28 and 29.

Figure 1:
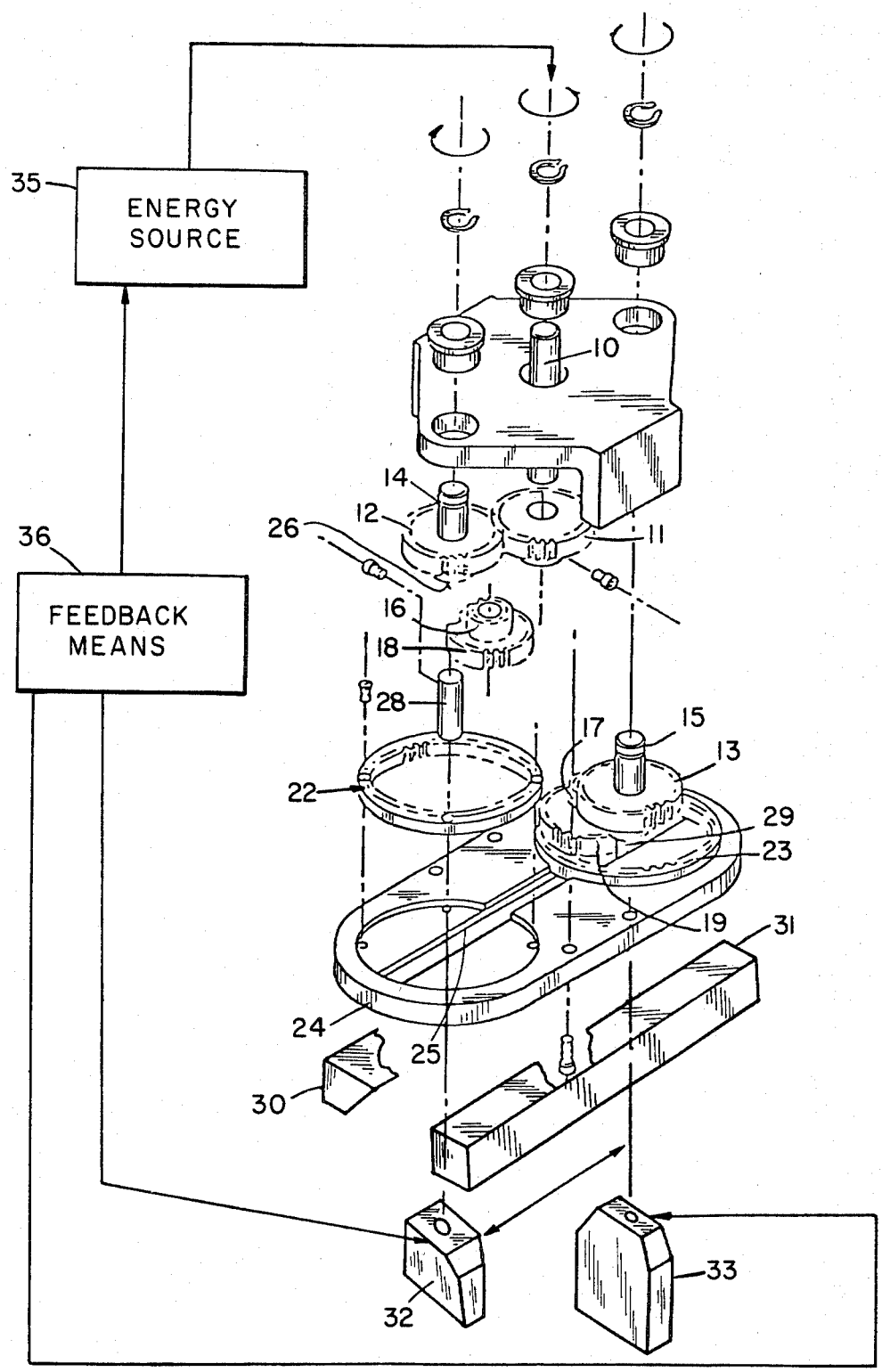
FIG. 1 is a partially exploded view of the gripper drive of the present invention.

In addition, a feedback means 36 can be coupled, for example, to the energy source and fingers 32 and 33 to sense the linear position of the fingers (see FIG. 1). Examples of such an embodiment are the use of a linear slide wire as part of the dove-tail retainers or the use of a rotary potentiometer at the rotary drive section to count the rotations of shaft 10. If the fingers are commanded to move a distance d to pick up an object, this command would be executed by energy source 35. Feedback means 36 monitors how far the fingers 32 and 33 have actually moved or how many rotations shaft 10 has actually made in response to the command to move a distance d. If a distance more or less than d (plus or minus a tolerance value) is moved, feedback means 36 passes this information back to energy source 35 so that energy source 35 can correct the discrepancy (i.e., feedback means 36 merely passes the actual distance moved or number of rotations made back to energy source 35).

The operation of the gripper drive system of the present invention follows directly from the description above. Rotation of shaft 10 in a clockwise or counterclockwise direction by the energy source drives fingers 32 and 33 to an open or closed position. The effect of the gear configuration employed in the present invention is that gears 18 and 19 are floating and driven about and within gears 22 and 23, respectively. This allows pins 28 and 29 (and associated fingers 32 and 33) to linearly traverse slot 25 which is located along a centerline of gears 22 and 23 in base 24.

Figure 4:
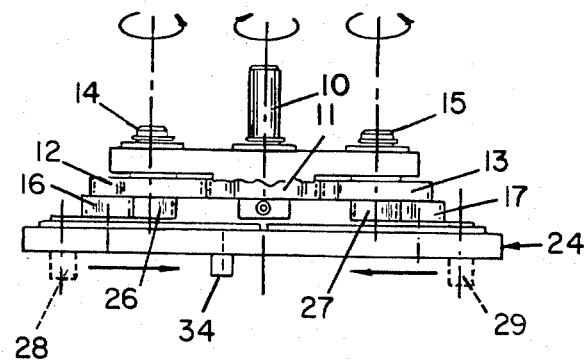
FIG. 4 is a side view of the gripper drive of the present invention with one stationary pin and one bidirectionally movable pin.
Figure 5:
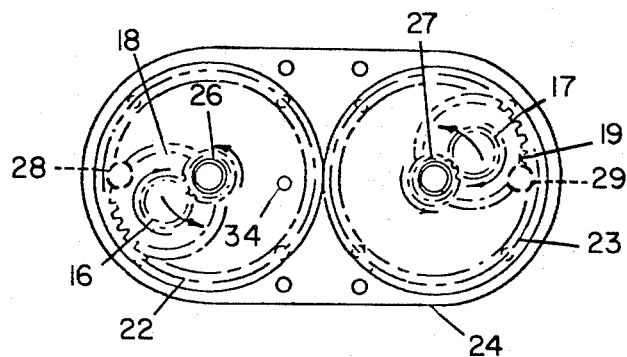
FIG. 5 is a top view of a portion of the gear arrangement of the gripper drive of the present invention with one stationary pin and one bidirectionally movable pin.

The present invention can also be embodied in a configuration comprising a stationary pin 34. In such a configuration (see FIGS. 4 and 5) pin 34 along with either pin 28 or pin 29 would form a pair of pins for providing gripping action. In this configuration, only one pin (pin 28 or pin 29) is moving. The internal gear design of the gripper drive of the present invention would be the same whether two movable pins are used or whether one movable pin and one stationary pin are used except that in the latter embodiment only one of the two pins 28 and 29 is present. Instead of the outright removal of either pin 28 or 29, one of these pins could merely be sheered off flush with the bottom of base 24.

The materials used to fabricate the gripper drive of the present invention are dependent, for example, upon cost-performance tradeoffs, desired life and reliability. The present invention can also be easily upgraded or downgraded to accommodate various load applications. Furthermore, various types of finger gripping attachments can be used in conjunction with the present invention.

Whereas we have illustrated and described the preferred embodiment of our invention, it is to be understood that we do not limit ourselves to the precise constructions herein disclosed and the right is reserved to all changes and modifications coming within the scope of the invention as defined in the appended claims.

We claim:

1. A drive for a robotic gripper system comprising:
    energy means;
    rotationally driven shaft means coupled to said energy means for transmitting energy provided by said energy means;
    an epicyclic gear system including at least, an internal gear, a floating gear which is retained against and within said internal gear, said shaft means driving an energy propagating gear which is operably connected to said floating gear for rotating said floating gear, wherein any point on the periphery of said floating gear travels in a linear direction;
    bidirectional linearly translateable pin means coupled to said floating gear; and
    finger means coupled to said pin means for gripping objects to be handled by said gripper system; the translation from rotary to linear motion occurring at said finger means;
    whereby objects to be handled by said gripper system are gripped and released under the control of said energy means.

2. A drive for a robotic gripper system according to claim 1 further comprising:
    a feedback means coupled to said energy source and said finger means for sensing the position of said finger means.

3. A drive for a robotic gripper system according to claim 1 or 2 wherein said epicyclic gear system includes:
    at least two floating gears fixed to said pin means, each of said floating gears being retained against and within a different one of said internal gears;
    at least two internal gears; each of said at least two internal gears coupled to a different one of said at least two floating gears;
    whereby said floating gears travel a circular path defined by the inner circumference of said internal gears.

4. A drive for a robotic gripper system according to claim 1 or 2 wherein said epicyclic gear system includes:
    a first gear coupled to said shaft means;
    a second gear and a third gear in mesh with said first gear;
    a first shaft coupled to said second gear;
    a second shaft coupled to said third gear;
    a fourth gear coupled to said second gear;
    a fifth gear coupled to said third gear;
    a sixth gear in mesh with said fourth gear;
    a seventh gear in mesh with said fifth gear;
    an eighth gear fixed to said pin means and coupled to said fourth gear;
    a ninth gear fixed to said pin means and coupled to said fifth gear;
    a tenth gear coupled to said pin means and in mesh with said eighth gear; and
    an eleventh gear coupled to said pin means and in mesh with said ninth gear.

5. A drive for a robotic gripper system according to claim 4 wherein said pin means includes:
    a first pin fixed to said eighth gear;
    a second pin fixed to said ninth gear; and
    a base having a slot; said base coupled to said tenth gear and said eleventh gear;
    whereby the path of bidirectional linear movement of said first pin and said second pin is defined by the circular path of said eighth gear and said ninth gear travelling within said tenth gear and said eleventh gear.

6. A drive for a robotic gripper system according to claim 5 wherein said finger means includes:
    a first finger coupled to said first pin; and
    a second finger coupled to said second pin.

7. A drive for a robotic gripper system comprising:
energy means;
a rotationally driven shaft means coupled to said energy means for transmitting energy provided by said energy means;
an epicyclic gear system including at least, an internal gear, a floating gear which is retained against and within said internal gear, said shaft means driving an energy propagating gear which is operably connected to said floating gear for rotating said floating gear, wherein any point on the periphery of said floating gear travels in a linear direction;
bidirectional linearly translateable pin means coupled to said floating gear; and
a base coupled to said gear means;
bidirectional linearly translateable pin means coupled to said floating gear; and
stationary pin means coupled to said base; and
finger means coupled to said translateable pin means and said stationary pin means for gripping objects to be handled by said gripper system;
whereby objects to be handled by said gripper system are gripped and released under the control of said energy means.

8. A drive for a robotic gripper system according to claim 7 further comprising:
a feedback means coupled to said energy source and said finger means for sensing the position of said finger means.

9. A drive for a robotic gripper system according to claim 7 or 8 wherein said epicyclic gear system includes:
at least two floating gears; at least one of said at least two floating gears fixed to said translateable pin means and each of said floating gears being retained against and within a different one of said internal gears;
at least two internal gears; each of said at least two internal gears coupled to a different one of said at least two floating gears;
whereby said floating gears travel a circular path defined by the inner circumference of said internal gears.

10. A drive for a robotic gripper system according to claim 7 or 8 wherein said epicyclic gear system includes:
a first gear coupled to said shaft means;
a second gear and a third gear in mesh with said first gear;
a first shaft coupld to said second gear;
a second shaft coupled to said third gear;
a fourth gear coupled to said second gear;
a fifth gear coupled to said third gear;
a sixth gear in mesh with said fourth gear;
a seventh gear in mesh with said fifth gear;
an eighth gear fixed to said translateable pin means and coupled to said fourth gear;
a ninth gear coupled to said fifth gear;
a tenth gear coupled to said translateable pin means and in mesh with said eighth gear; and
an eleventh gear in mesh with said ninth gear.

11. A drive for a robotic gripper system according to claim 10 wherein said translateable pin means includes:
a pin fixed to said eighth gear;
whereby the path of bidirectional linear movement of said pin is defined by the circular path of said eighth gear and said ninth gear travelling within said tenth gear and said eleventh gear.

12. A drive for a robotic gripper system according to claim 11 wherein said finger means includes:
a first finger coupled to said pin; and
a second finger coupled to said stationary pin means.

* * * * *